United States Patent
Rao et al.

(10) Patent No.: US 8,477,796 B1
(45) Date of Patent: Jul. 2, 2013

(54) SYSTEM, METHOD, AND COMPUTER PROGRAM PRODUCT FOR PROCESSING DIFFERENT CONTENT EACH STORED IN ONE OF A PLURALITY OF QUEUES

(75) Inventors: Ravi Honnavalli Ramachandra Rao, Bangalore (IN); Arun Rajaraman, Pune (IN); Harish Balasubramanian, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 344 days.

(21) Appl. No.: 12/029,960

(22) Filed: Feb. 12, 2008

(51) Int. Cl.
*H04L 12/28* (2006.01)

(52) U.S. Cl.
USPC ......... 370/412; 370/289; 370/413; 370/415; 370/417; 370/428; 726/22; 726/23; 726/24; 726/25; 713/153; 713/154

(58) Field of Classification Search
USPC .. 370/412, 389, 413, 415, 417, 428; 709/228, 709/224, 207; 726/22–25; 713/153, 154
See application file for complete search history.

(56) References Cited

U.S. PATENT DOCUMENTS

| | | | | |
|---|---|---|---|---|
| 6,570,876 | B1 * | 5/2003 | Aimoto | 370/389 |
| 6,772,345 | B1 * | 8/2004 | Shetty | 726/24 |
| 7,818,343 | B1 * | 10/2010 | Sekhar et al. | 707/781 |
| 7,962,645 | B2 * | 6/2011 | Dain et al. | 709/238 |
| 2005/0228892 | A1 * | 10/2005 | Riley et al. | 709/228 |
| 2006/0248033 | A1 * | 11/2006 | Ramsey et al. | 707/1 |
| 2007/0094142 | A1 * | 4/2007 | Russell et al. | 705/52 |
| 2007/0198741 | A1 * | 8/2007 | Duffy et al. | 709/245 |
| 2007/0204036 | A1 * | 8/2007 | Mohaban et al. | 709/224 |
| 2007/0214263 | A1 * | 9/2007 | Fraisse et al. | 709/225 |
| 2008/0062881 | A1 * | 3/2008 | Martin et al. | 370/238 |
| 2008/0071811 | A1 * | 3/2008 | Parkinson et al. | 707/101 |
| 2008/0140607 | A1 * | 6/2008 | Chi et al. | 707/2 |
| 2008/0256634 | A1 * | 10/2008 | Pichler | 726/23 |
| 2008/0285578 | A1 * | 11/2008 | DeLay et al. | 370/412 |
| 2010/0091676 | A1 * | 4/2010 | Moran et al. | 370/252 |

* cited by examiner

*Primary Examiner* — Dang T Ton
*Assistant Examiner* — Mandish Randhawa
(74) *Attorney, Agent, or Firm* — Patent Capital Group

(57) ABSTRACT

A system, method, and computer program product are provided for processing different content each stored in one of a plurality of queues. In use, a plurality of different content is identified for processing. Additionally, each of the different content is stored in one of a plurality of queues based on a classification thereof. Furthermore, the plurality of different content stored in the plurality of queues is processed.

17 Claims, 6 Drawing Sheets

SYSTEM, METHOD, AND COMPUTER PROGRAM PRODUCT FOR PROCESSING DIFFERENT CONTENT EACH STORED IN ONE OF A PLURALITY OF QUEUES

FIELD OF THE INVENTION

The present invention relates to content processing, and more particularly to storing content for processing.

BACKGROUND

Traditionally, content has been processed for a variety of purposes. Just by way of example, content processing sometimes includes scanning the content for unwanted data (e.g. utilizing a security system, etc.). However, conventional techniques utilized for processing content have generally exhibited various limitations, especially with respect to providing quality of service for such content processing. For example, different content has customarily been processed without regards to a priority of such content. Thus, the processing of high priority content is oftentimes delayed when processing resources are consumed with processing large amounts of content and/or when the processing of other lower priority content is time intensive.

There is thus a need for overcoming these and/or other issues associated with the prior art.

SUMMARY

A system, method, and computer program product are provided for processing different content each stored in one of a plurality of queues. In use, a plurality of different content is identified for processing. Additionally, each of the different content is stored in one of a plurality of queues based on a classification thereof. Furthermore, the plurality of different content stored in the plurality of queues is processed.

DETAILED DESCRIPTION

Figure 1:
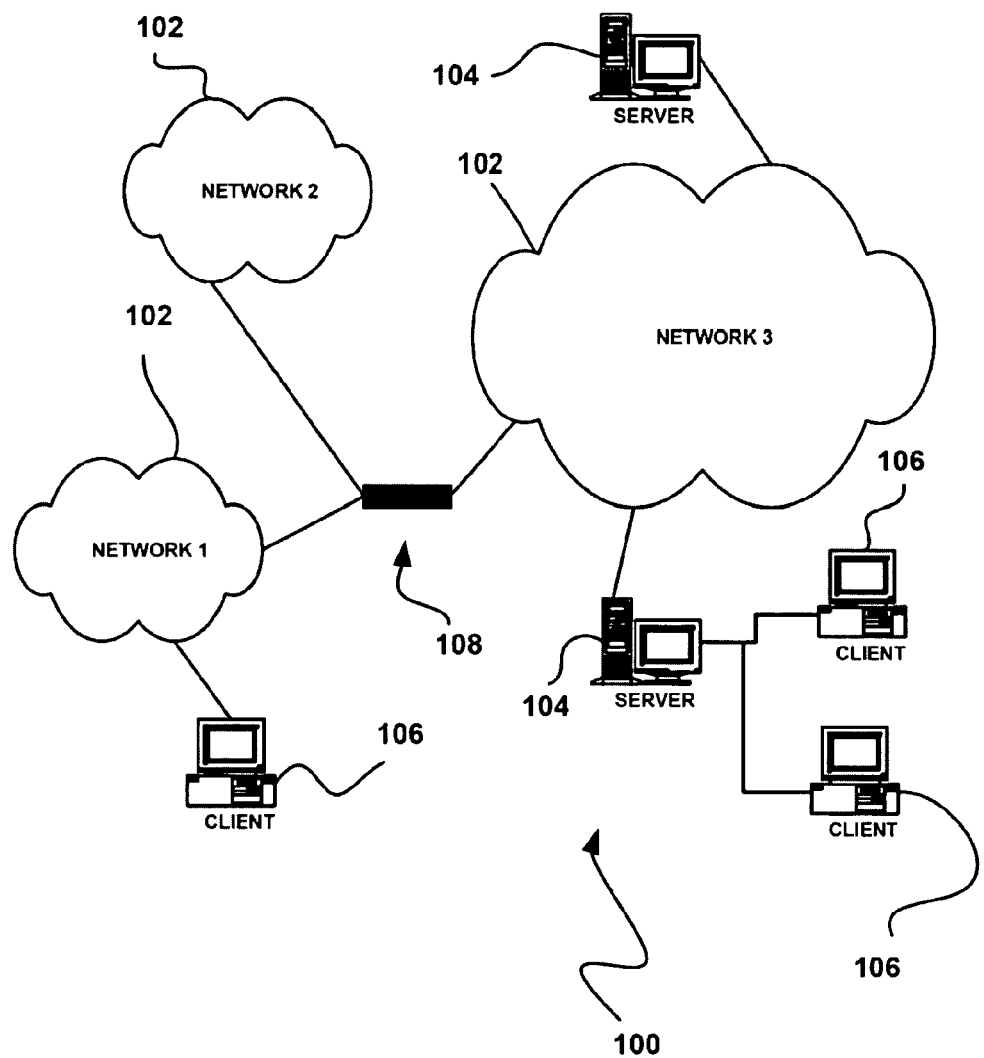
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
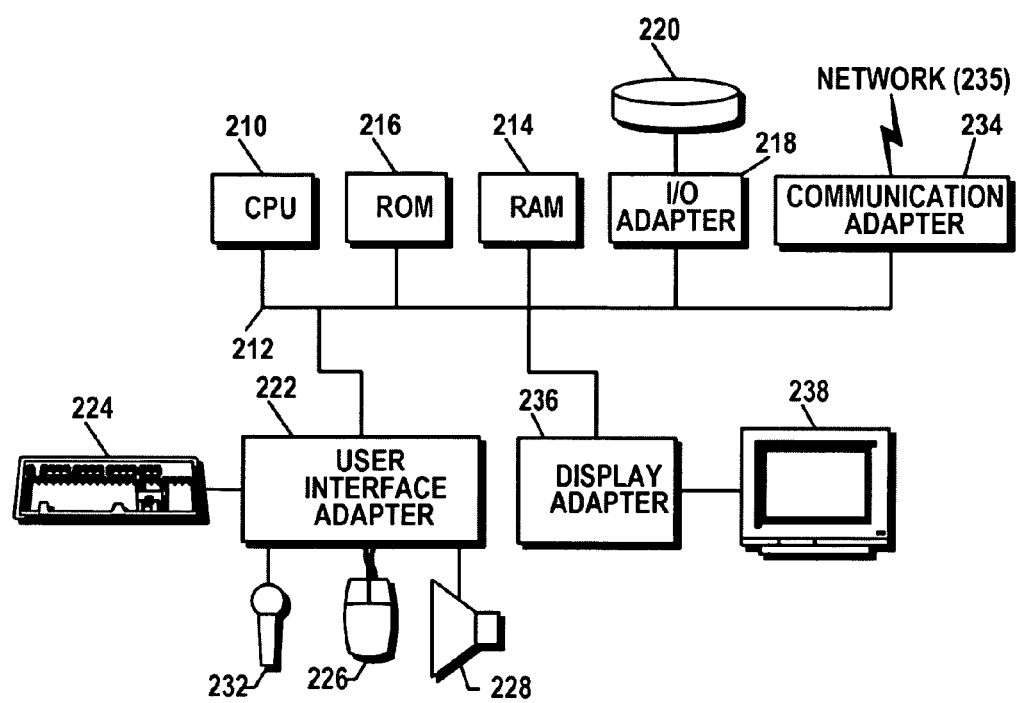
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
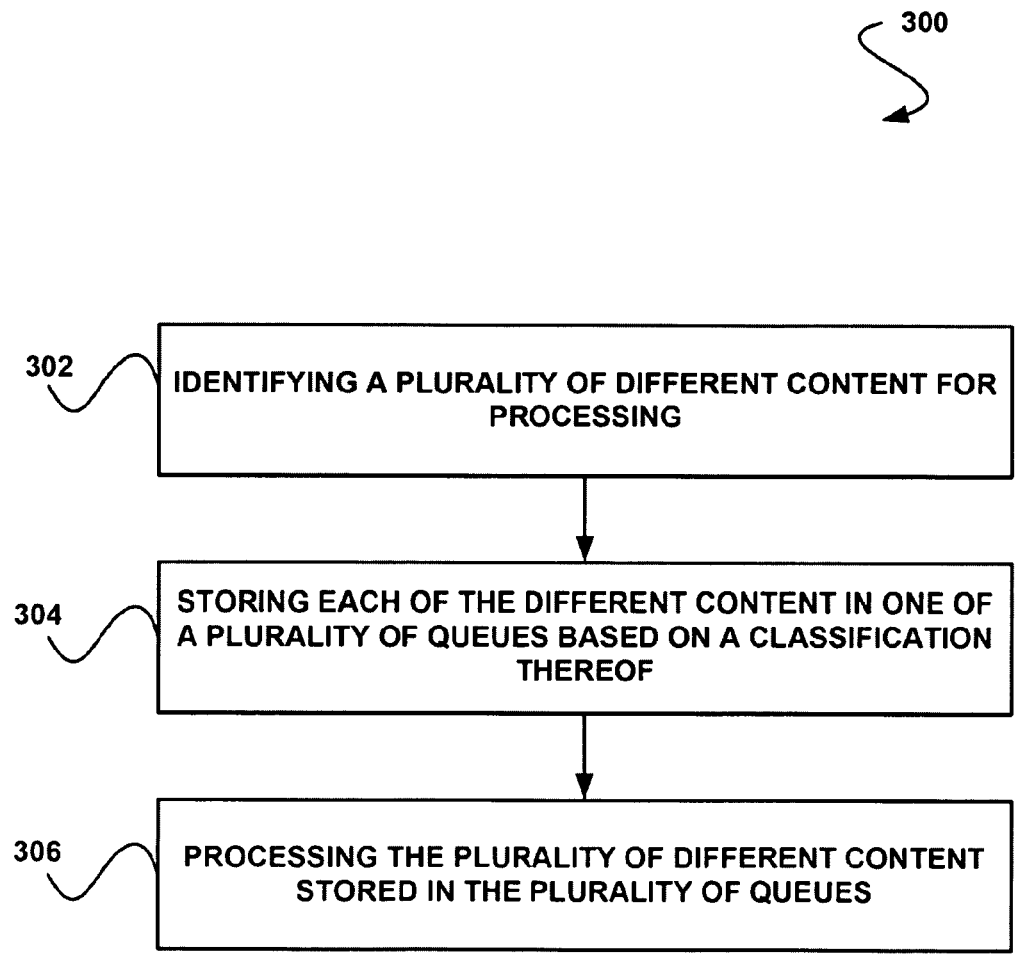
FIG. 3 shows a method for processing different content each stored in one of a plurality of queues, in accordance with one embodiment.

FIG. 3 shows a method 300 for processing different content each stored in one of a plurality of queues, in accordance with one embodiment. As an option, the method 300 may be carried out in the context of the architecture and environment of FIGS. 1 and/or 2. Of course, however, the method 300 may be carried out in any desired environment.

As shown in operation 302, a plurality of different content is identified for processing. In the context of the present description, the content may include any data, code, etc. capable of being processed. Just by way of example, the content may include electronic mail (email) messages, websites, files, etc.

In one embodiment, the different content may be identified in response to a communication of such different content over a network. As an option, the network may include any of the networks described above with respect to FIG. 1. In another embodiment, the different content may be identified at a gateway. Of course, however, the different content may be identified by any type of device (e.g. such as any of the devices described above with respect to FIGS. 1 and/or 2).

Additionally, the processing for which the different content is identified may include any process performed with respect to the different content. In one embodiment, the processing may include scanning the different content. Such scanning may be performed for detecting unwanted data (e.g. malware, unsolicited data, etc.) associated with the different content, preventing data leakage associated with communication of the different content, etc.

Further, as shown in operation 304, each of the different content is stored in one of a plurality of queues based on a classification thereof. It should be noted that the classification of each of the different content may be identified by classifying the different data in any desired manner. For example, the different data may be classified based on predetermined (e.g. manually configured, etc.) classifications.

In one embodiment, the classification of each of the different content may be based on a group to which the content is associated. Thus, each of a plurality of groups may be associated with a different classification (e.g. a group classification, etc.). Such groups may include user groups, geographical groups, device groups, sub-domain groups, etc. As an option, the groups may be manually configured (e.g. to indicate members of such groups, etc.).

Just by way of example, the user groups may include a plurality of groups that each include different users. Thus, an administrator group may optionally include administrator users. In this way, content associated with a particular user may be classified according to the user group to which the user belongs.

As another example, the geographical groups may include a plurality of groups that each include at least one different geographical location. Accordingly, content associated with a particular geographical location may be classified according to the geographical group including such geographical location. As yet another example, the device groups may include a plurality of groups that each include at least one different device, device type, etc., such that content associated with a particular device may be classified according to the device group including such device.

As still yet another example, the sub-domain group may include a plurality of groups that each include at least one different sub-domain. To this end, content associated with a particular sub-domain may be classified according to the sub-domain group including such sub-domain.

In another embodiment, each of the different content may be classified based on at least one characteristic of such content. For example, each of the different content may optionally be classified with respect to a particular classification if characteristics of such content match characteristics of the classification. The characteristics may include users included in the classification, devices included in the classification, geographical locations included in the classification, etc.

In various embodiments, the characteristics of the different content may include an interne protocol (IP) address of a source of each of the different content, an electronic mail address of a source of each of the different content, an electronic mail address of a destination of each of the different content, a lightweight directory access protocol associated with each of the different content, etc. As an option, the characteristics of the different content may indicate a user, a device, a geographical location, a sub-domain, etc. For example, the IP address of the source of each of the different content may indicate a user and/or device associated with each of the different content.

In this way, each of the different content may be classified, such that each of the different content may be stored in one of the plurality of queues based on the classification. The queues may each include any type of data structure in which each of the different content may be stored (e.g. and optionally accessed in a first-in-first-out manner, etc.). As an option, each of the queues may be located on a device via which the different content is identified.

In one embodiment, each of the queues may be associated with a different classification. For example, a queue may be provided for each classification according to which the different content may be classified. In this way, each of the different content may be stored in only one of the queues, by matching the classification of the different content with the queue associated with such classification.

Still yet, the plurality of different content stored in the plurality of queues is processed, as shown in operation 306. As noted above, the processing may include performing any process with respect to the different content, such as scanning the different content. Optionally, the different content may be processed by the device utilized for identifying and storing the different content.

In one embodiment, each of the different content may be processed according to a classification of such different content. For example, each of the different classifications may be associated with a unique priority. Furthermore, such unique priority may be manually configured, as an option. In this way, the processing of each of the different content stored in the plurality of queues may optionally be prioritized based on the unique priority associated with the classification of such different content.

In another embodiment, each of the different content stored in the queues may be processed in a round robin manner. For example, a first content stored in a queue associated with a classification of a highest priority may be processed first, a first content stored in a queue associated with a classification of next highest priority may be processed second, and so forth. Once a first content stored in a queue associated with a classification of a lowest priority is processed, a second content stored in the queue associated the classification of the highest priority may be processed, etc.

Processing the different content in such a prioritized manner may be utilized for providing quality of service, as an option. In one embodiment, each of the classifications of content may be predefined in a manner that progressively limits the amount of content classified with respect to a classification associated with a lowest priority to a classification associated with a highest priority. Thus, less different content may be associated with a classification of a highest priority, and further stored in an associated queue, than the amount of different content associated with a classification of a next highest priority, etc. In this way, the amount of different content stored in each queue may optionally be proportional to the associated group within which the different content is classified.

Furthermore, processing the different content stored in each of the queues based on the classification priority may provide higher quality of service with respect to the processing of content with higher priority classifications. For example, it may be ensured that, during round robin processing, such higher priority classified content is processed prior to lower priority classified content. As another example, queues with less amount of different content may have the processing of the different content stored therein finish prior to queues with a greater amount of different content, based on the round robin processing scheme.

Just by way of example, an administrator user group classification may include a lower number of users, and thus be associated with a lower amount of identified different content, than an engineer group classification which includes a higher number of users. Thus, less different content may be stored in the queue associated with the administrator user group classification than the queue associated with the engineer group classification. To this end, quality of service may be provided with respect to processing the different content classified under the administrator user group classification by limiting the amount of different content stored in the queue associated with the administrator user group classification.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
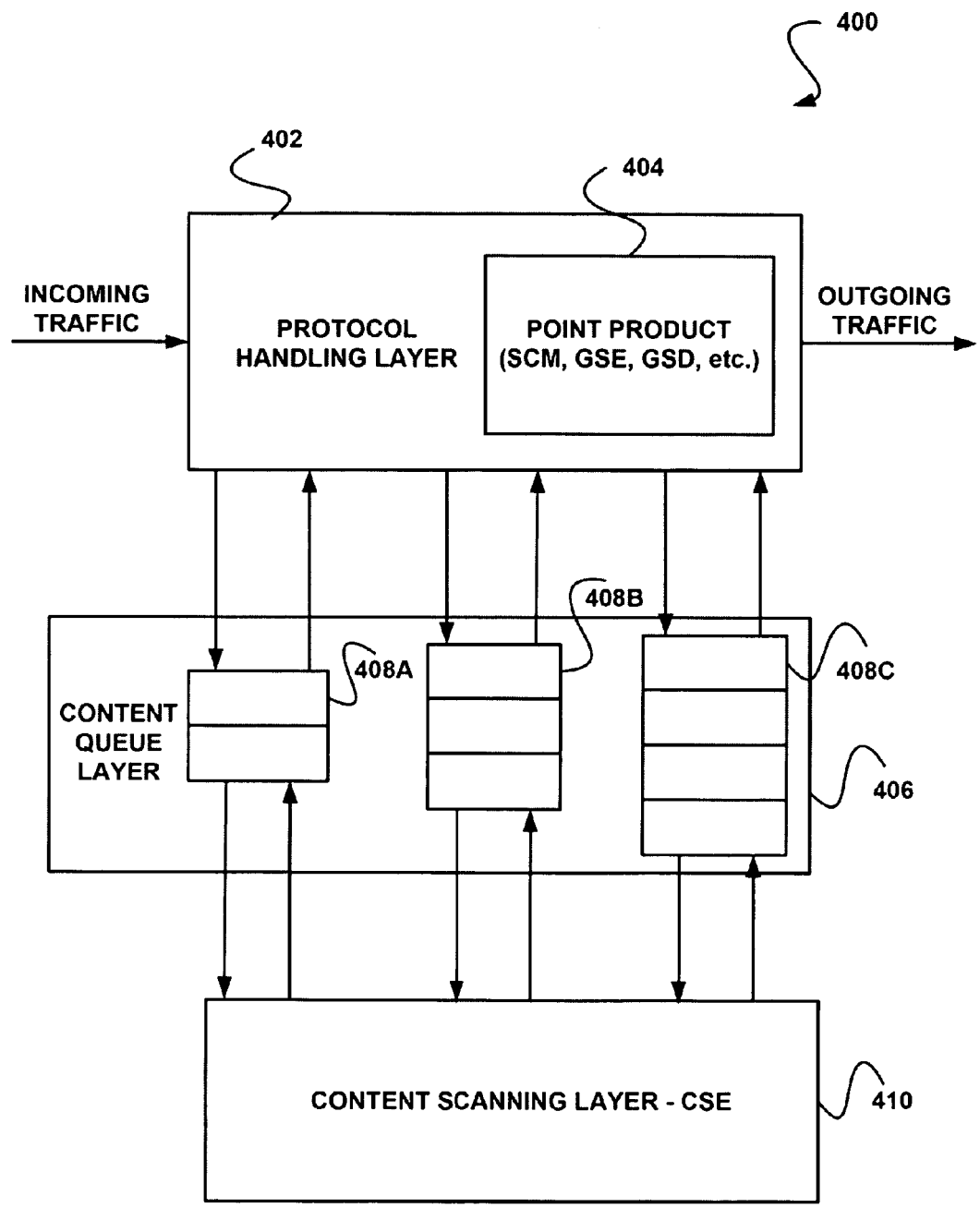
FIG. 4 shows a system for processing different content each stored in one of a plurality of queues, in accordance with another embodiment.

FIG. 4 shows a system 400 for processing different content each stored in one of a plurality of queues, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, incoming traffic is received by the system 400 and outgoing traffic is sent by the system 400. In the context of the present embodiment, the incoming traffic and/or outgoing traffic may include a plurality of different content. For example, the system 400 may process the incoming traffic prior to forwarding such traffic as the outgoing traffic.

Thus, in one embodiment, the system 400 may include a gateway interfacing a first network (e.g. an internal network, such as a LAN, etc.) and at least one other second network (e.g. an external network, such as the Internet, etc.), such that different content may be sent between networks via the gateway. In another embodiment, the system 400 may include a device utilized for processing different content communicated within a single network (e.g. an internal network, such as a LAN, etc.). Of course, it should be noted that the system 400 may include any number of different devices in communication with one another.

As shown, a plurality of different content is received by a protocol handling layer 402. The protocol handling layer 402 may include a point product 404. While the point product 404 is shown as being included in the protocol handling layer 402, it should be noted that the point product 404 may include the protocol handling layer 402, in addition to a content queue layer 406 and a content scanning layer 410, as an option.

Such point product 404 may include any application utilized for processing the different content received by the protocol handling layer 402. For example, the point product 404 may include a security system. In various embodiments, the point product may include McAfee® Secure Content Management™, McAfee® GroupShield® Exchange, McAfee® GroupShield® Domino, etc.

In response to receipt of the different content, the protocol handling layer 402 determines a classification for each of the different content. In one embodiment, the protocol handling layer 402 may classify the different content according to one of a plurality of predefined classifications. For example, at least one characteristic of each of the different content (e.g. a source IP address of the different content, etc.) may be matched to a characteristic included in one of the predefined classifications (e.g. an IP address range of one of the predefined classifications, etc.). As an option, a mapping table may be utilized for determining the classification of each of the different content.

The protocol handling layer 402 further stores each of the different content in one of a plurality of queues 408A-C, based on the classification thereof. For example, each of the queues 408A-C may be associated with a particular classification, and thus may be utilized for storing different content of such classification. Accordingly, a queue 408A-C may be provided for each predefined classification. As shown, the queues 408A-C are located in the content queue layer 406 (e.g. of the point product 404).

Optionally, the queues 408A-C may be of different sizes. In one embodiment, the size of each of the queues 408A-C may be proportional to a number of characteristics included in an associated classification. Just by way of example, a queue utilized for storing different content associated with a classification including a fewer number of source IP addresses may be smaller than a queue utilized for storing different content associated with a classification including a larger number of source IP addresses.

In this way, the protocol handling layer 402 may store different content of a particular classification in one of the queues 408A-C associated with such particular classification. Moreover, the content scanning layer 410 (e.g. of the point product 404) retrieves each of the different content from the queues 408A-C for processing thereof. Such processing may include scanning the different content for unwanted data, as an option.

In one embodiment, each of the different content may be retrieved and processed in a round robin manner. For example, each of the predefined classifications may be associated with a unique priority. Thus, a first content stored in one of the queues 408A associated with a highest priority classification may be retrieved and processed first, a first content stored in another one of the queues 408B associated with a next highest priority classification may be retrieved and processed second, a first content stored in yet another one of the queues 408C associated with yet a next highest priority classification may be retrieved and processed third, etc.

In this way, different content located at the front of each of the queues 408A-C may be processed in sequence based on a priority of the classification of such different content. Such round robin processing may allow processing of all of the different content stored in the queue 408A with the lesser number of different content stored therein to be finished more quickly than processing of all of the different content stored in the queue 408B and 408C with a greater number of different content stored therein. Accordingly, the processing of each of the different content may be implicitly prioritized based on the classification of each of such different content.

Optionally, the content queue layer 406 may be implemented in any desired point product 404, for providing such implicit prioritization. In this way, quality of service may be provided for such point product 404 by ensuring higher quality of service in processing different content with a classification associated with a higher priority than a lower priority. Providing quality of service in this manner may optionally limit or even expel use of quality of service tagging (e.g. adding flags into content headers, etc.), use of which may otherwise be cumbersome by requiring each layer associated with the processing to be capable of facilitating such tagging.

Still yet, results of the processing are returned to the protocol handling layer 402 via the content queue layer 406. The results may be utilized by the protocol handling layer 402 in any desired manner. In one embodiment, the protocol handling layer 402 may filter the different content based on the results. For example, if the results indicate that content is unwanted, such content may be discarded, prevented from being communicated from the system 400 as outgoing traffic, etc.

As another option, characteristics associated with any of the classifications may be adjusted in response to a report. The report may indicate an amount of different content stored in each of the queues 408A-C. Thus, if a first queue associated with a classification of a higher priority is reported as storing a greater amount of different content than a second queue associated with a classification of a lower priority, characteristics included in the classification of the higher priority may be adjusted. Such adjustment may be manual or automatic. In addition, the adjustment may include reducing the characteristics included in the classification of the higher priority, for limiting the amount of content classified with such classification.

Figure 5:
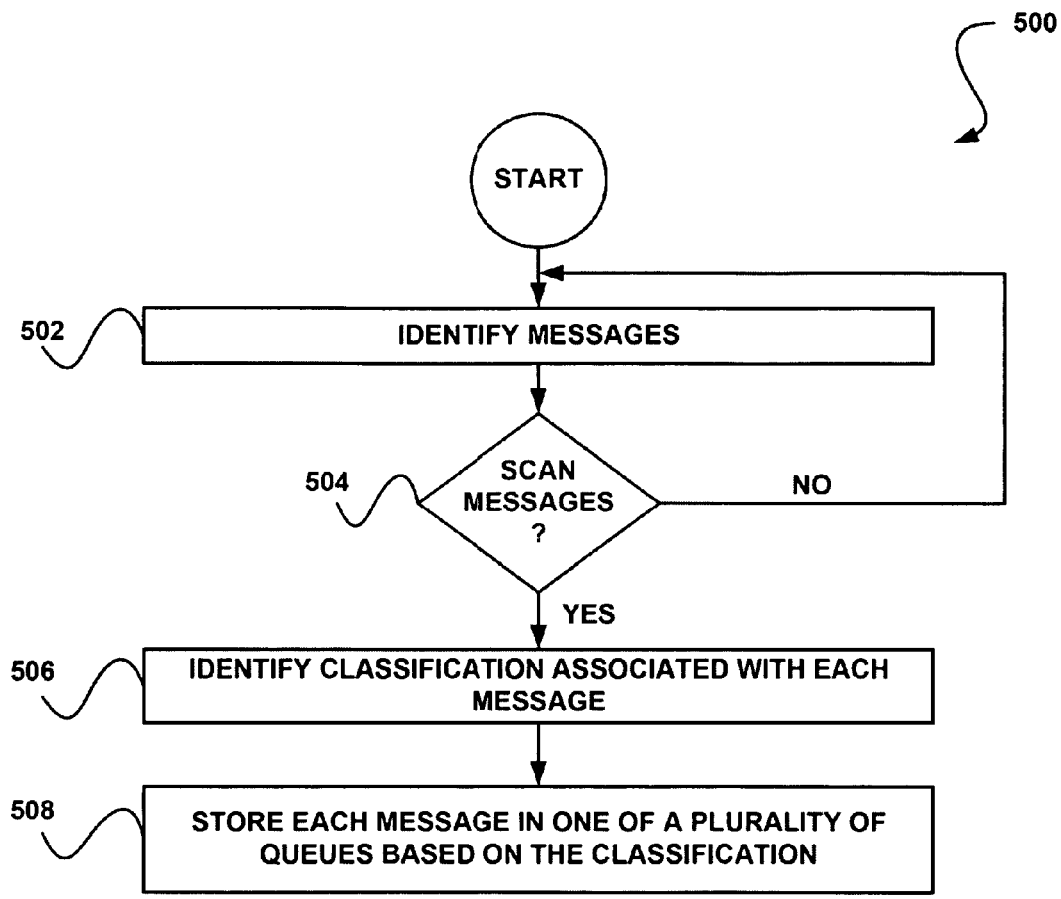
FIG. 5 shows a method for storing each of a plurality of messages in one of a plurality of queues based on a classification thereof, in accordance with yet another embodiment.

FIG. 5 shows a method 500 for storing each of a plurality of messages in one of a plurality of queues based on a classification thereof, in accordance with yet another embodiment. As an option, the method 500 may be carried out in the context of the architecture and environment of FIGS. 1-4. For example, the method 500 may be carried out utilizing the protocol handling layer 402 of FIG. 4. Of course, however, the method 500 may be carried out in any desired environment. Again, it should be noted that the aforementioned definitions may apply during the present description.

As shown in operation 502, messages are identified. In the context of the present embodiment, the messages may each include any type of electronic message. For example, the message may include email messages.

Additionally, it is determined whether the messages are to be scanned, as shown in decision 504. In one embodiment, it may be determined that the messages are to be scanned if the messages are of a predetermined type (e.g. the messages include an attachment, the messages include a predetermined subject header, the messages are from a particular network, etc.). Of course, however, the determination may be based on any desired criteria (e.g. manually defined, etc.). Optionally, the determination may be made for each of the messages.

If it is determined that the messages are to be scanned (e.g. for unwanted data, etc.), a classification associated with each message is identified, note operation 506. In this way, it may optionally be determined for each message whether such message is to be scanned (decision 504), such that each message that is to be scanned, a classification thereof may be identified. In one embodiment, the classification may be identified by mapping at least one characteristic of a message to a classification including such characteristic (e.g. utilizing a table, etc.).

Furthermore, as shown in operation 508, each message is stored in one of a plurality of queues based on the classification. Each of the queues may be associated with a different classification, as an option. Thus, a message with a particular classification may be stored in a queue associated with such classification. In this way, each queue may store messages of the same classification.

Figure 6:
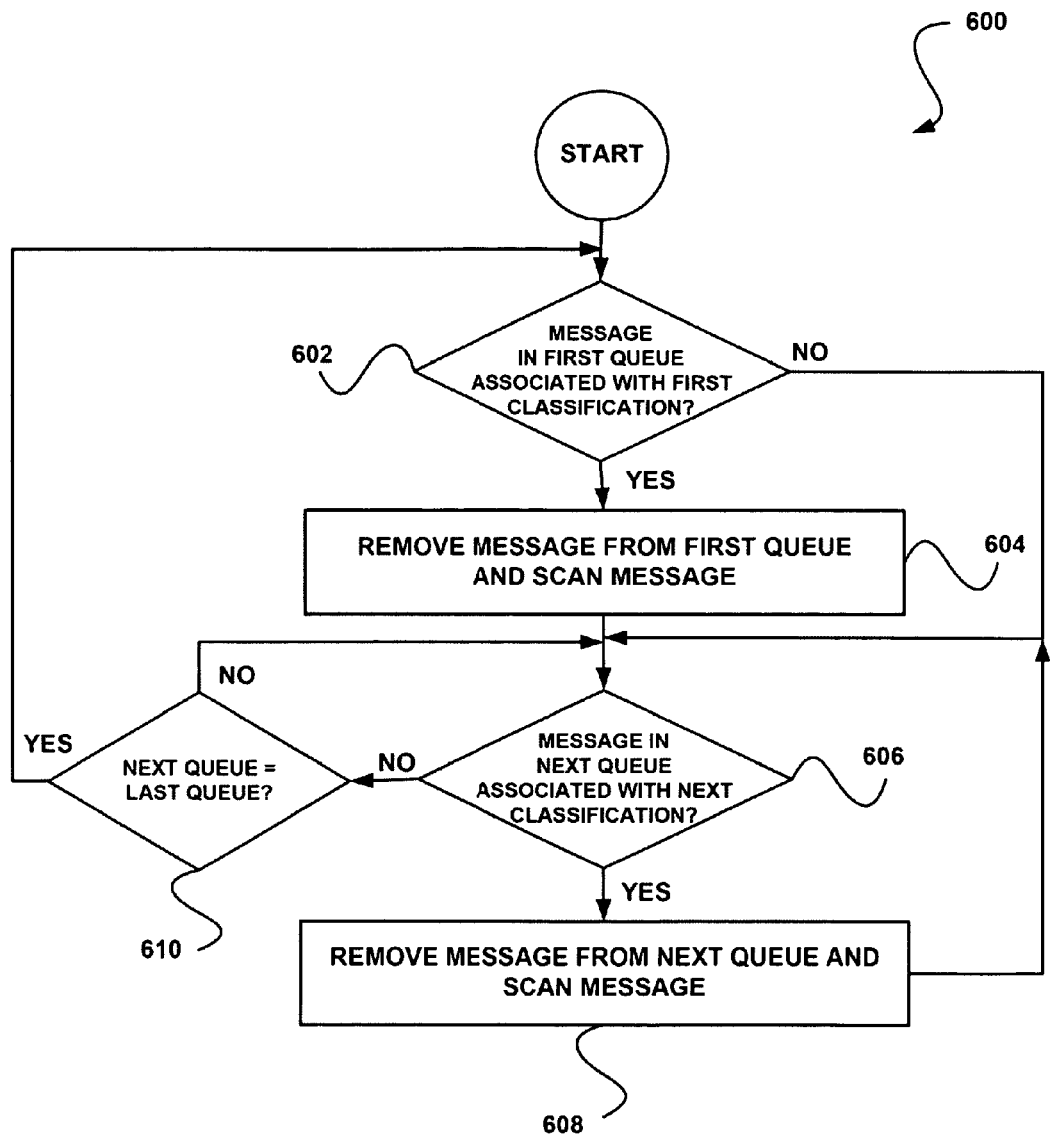
FIG. 6 shows a method for scanning a plurality of messages each stored in one of a plurality of queues, in accordance with still yet another embodiment.

FIG. 6 shows a method 600 for scanning a plurality of messages each stored in one of a plurality of queues, in accordance with still yet another embodiment. As an option, the method 600 may be carried out in the context of the architecture and environment of FIGS. 1-5. For example, the method 600 may be carried out utilizing the content scanning layer 410 of FIG. 4. Of course, however, the method 600 may be carried out in any desired environment. Yet again, it should be noted that the aforementioned definitions may apply during the present description.

As shown in decision 602, it is determined whether a message is located in a first queue associated with a first classification. In the context of the present embodiment, the first classification may include any classification of messages that is associated with a highest priority. For example, the first classification may be assigned the highest priority manually (e.g. by an administrator, etc.). Also in the context of the present embodiment, the first queue may include any queue utilized for storing messages classified with the first classification.

If it is determined that a message is located in a first queue associated with a first classification, a first message in the first queue is removed from the first queue and scanned. Note operation 604. In this way, a first message stored in a queue associated with a classification of a highest priority (the first queue) may be identified and removed from such queue. Further, such first message may be scanned for any desired content, such as unwanted data, confidential data, etc.

If, however, it is determined in decision 602 that a message is not located in a first queue associated with a first classification, or in response to the scanning of the first message in operation 604, it is further determined whether a message is located in a next queue associated with a next classification. Note decision 606. With respect to the present embodiment, the next classification may include a classification with a next highest priority. For example, the next classification may be assigned the next highest priority manually. Accordingly, the next queue may include any queue storing messages classified with the next classification of the next highest priority.

If it is determined that a message is located in the next queue associated with the next classification, the first message stored in the next queue (e.g. the message stored at the front of the next queue) is removed from such next queue and scanned. Note operation 608. To this end, a first message stored in a queue associated with a classification of a next highest priority (the next queue) may be identified, removed from such queue, and scanned.

Moreover, it is again determined whether a message is located in a yet a next queue associated with another next classification (decision 606). Once it is determined in decision 606 that a message is not located in the next queue associated with the next classification, it is determined whether the next queue (in which it has been determined that a message is not located) is a last queue, as shown in decision 610. The last queue may include any queue associated with a classification of a last priority, with respect to the present embodiment.

If the next queue in which it has been determined that a message is not located is not the last queue, it is again determined whether a message is located in a yet a next queue associated with another next classification (decision 606). In this way, different content stored in the front of each of the queues may be scanned in a sequence based on a priority of a classification associated with each of the queues. If, however, it is determined that the next queue in which it has been determined that a message is not located is the last queue, it is again determined whether a message is located in the first queue associated with the first classification (decision 602).

Thus, once the front message, if any, in each queue has been scanned according to the sequence indicated by the classification priorities, the method 600 returns to processing the first message with the highest priority classification that is identified as being located in the front of a queue. Accordingly, the messages in the queues may be scanned in a round robin manner.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for performing operations, comprising:
   identifying a plurality of different content for processing;
   storing each of the different content in one of a plurality of queues based on a classification thereof;
   scanning the plurality of different content stored in the plurality of queues for unwanted data, wherein each of the plurality of queues is associated with a different classification and each of the different classifications is associated with a unique priority, and wherein the different classifications include device type and geographic location that are associated with an individual one of the plurality of queues, and wherein the queues are scanned for unwanted data in a sequence based on their respective priorities; and
   prohibiting the unwanted data identified by the scanning from being sent as outgoing traffic to a next destination.

2. The computer program product of claim 1, wherein the plurality of different content includes a plurality of electronic messages.

3. The computer program product of claim 1, wherein the plurality of different content is identified at a gateway.

4. The computer program product of claim 1, wherein the plurality of different content is identified in response to being communicated over a network.

5. The computer program product of claim 1, wherein the classification of each of the different content is based on a group associated with each of the different content.

6. The computer program product of claim 5, wherein the group includes one of a user group and a sub-domain group.

7. The computer program product of claim 5, wherein the group is manually configured.

8. The computer program product of claim 1, wherein the unique priority associated with each of the different classifications is manually configured.

9. The computer program product of claim 1, further comprising identifying a first content stored in one of the plurality of queues with a classification of a highest priority.

10. The computer program product of claim 9, further comprising removing the first content from the one of the plurality of queues with the classification of the highest priority, and scanning the first content via the processing.

11. The computer program product of claim 10, further comprising identifying a next first content stored in another one of the plurality of queues with a classification of a next highest priority, removing the next first content from the one of the plurality of queues with the classification of the next highest priority, and scanning the next first content.

12. The computer program product of claim 1, wherein different content stored in a front of each of the plurality of queues is processed in a sequence based on a priority of a classification associated with each of the plurality of queues.

13. The computer program product of claim 1, wherein the computer program product is operable such that the adjustment of the classification of the higher priority associated with the first queue includes reducing the characteristics included in the classification of the higher priority, for limiting an amount of content classified with the classification of the higher priority.

14. The computer program product of claim 1, wherein the computer program product is operable such that the processing the plurality of different content includes scanning and filtering the plurality of different content for unwanted data, such that the unwanted data is prevented from being communicated as outgoing traffic.

15. A method, comprising:
   identifying a plurality of different content for processing;
   storing each of the different content in one of a plurality of queues based on a classification thereof; and
   scanning the plurality of different content stored in the plurality of queues for unwanted data, wherein each of the plurality of queues is associated with a different classification and each of the different classifications is associated with a unique priority, and wherein the different classifications include device type and geographic location that are associated with an individual one of the plurality of queues, and wherein the queues are scanned for unwanted data in a sequence based on their respective priorities; and
   prohibiting the unwanted data identified by the scanning from being sent as outgoing traffic to a next destination.

16. A system, comprising:
   a processor and a memory, wherein the system is configured for:
      identifying a plurality of different content for processing,
      storing each of the different content in one of a plurality of queues based on a classification thereof, and
      scanning the plurality of different content stored in the plurality of queues for unwanted data, wherein each of the plurality of queues is associated with a different classification and each of the different classifications is associated with a unique priority, and wherein the different classifications include device type and geographic location that are associated with an individual one of the plurality of queues, and wherein the queues are scanned for unwanted data in a sequence based on their respective priorities, and
      prohibiting the unwanted data identified by the scanning from being sent as outgoing traffic to a next destination.

17. The system of claim 16, wherein the processor is coupled to memory via a bus.

\* \* \* \* \*